(12) United States Patent
Cao et al.

(10) Patent No.: US 12,141,608 B2
(45) Date of Patent: *Nov. 12, 2024

(54) SYSTEMS AND METHODS OF RESOURCE CONFIGURATION OPTIMIZATION FOR MACHINE LEARNING WORKLOADS

(71) Applicant: HEWLETT PACKARD ENTERPRISE DEVELOPMENT LP, Spring, TX (US)

(72) Inventors: Lianjie Cao, Milpitas, CA (US); Faraz Ahmed, Milpitas, CA (US); Puneet Sharma, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,695

(22) Filed: Sep. 19, 2023

(65) Prior Publication Data
US 2024/0004710 A1    Jan. 4, 2024

Related U.S. Application Data

(63) Continuation of application No. 16/874,479, filed on May 14, 2020, now Pat. No. 11,797,340.

(51) Int. Cl.
*G06F 9/50* (2006.01)
*G06F 9/30* (2018.01)
(Continued)

(52) U.S. Cl.
CPC .......... *G06F 9/5005* (2013.01); *G06F 9/3009* (2013.01); *G06F 9/5011* (2013.01);
(Continued)

(58) Field of Classification Search
None
See application file for complete search history.

(56) References Cited

U.S. PATENT DOCUMENTS

| 10,257,275 B1 | 4/2019 | Dirac et al. |
| 10,592,386 B2 | 3/2020 | Walters et al. |

(Continued)

OTHER PUBLICATIONS

Li et al., "Hyperband: a Novel Bandit-Based Approach to Hyperparameter Optimization," Journal of Machine Learning Research 18 (2018), pp. 1-52, last retrieved from https://www.jmlr.org/papers/volume18/16-558/16-558.pdf on Sep. 25, 2024. (Year: 2018).*

(Continued)

*Primary Examiner* — Andrew M. Lyons
(74) *Attorney, Agent, or Firm* — Hewlett Packard Enterprise Patent Department

(57) ABSTRACT

Systems and methods are provided for optimally allocating resources used to perform multiple tasks/jobs, e.g., machine learning training jobs. The possible resource configurations or candidates that can be used to perform such jobs are generated. A first batch of training jobs can be randomly selected and run using one of the possible resource configuration candidates. Subsequent batches of training jobs may be performed using other resource configuration candidates that have been selected using an optimization process, e.g., Bayesian optimization. Upon reaching a stopping criterion, the resource configuration resulting in a desired optimization metric, e.g., fastest job completion time can be selected and used to execute the remaining training jobs.

21 Claims, 7 Drawing Sheets

(51) Int. Cl.
  *G06F 11/34* (2006.01)
  *G06F 18/214* (2023.01)
  *G06F 18/2415* (2023.01)
  *G06N 20/00* (2019.01)
(52) U.S. Cl.
  CPC .......... *G06F 9/505* (2013.01); *G06F 11/3409* (2013.01); *G06F 18/214* (2023.01); *G06F 18/24155* (2023.01); *G06N 20/00* (2019.01)

(56) References Cited

U.S. PATENT DOCUMENTS

| | | | |
|---|---|---|---|
| 11,392,751 | B1 | 7/2022 | Szarvas et al. |
| 11,423,333 | B2 | 8/2022 | Qi et al. |
| 11,537,439 | B1 | 12/2022 | Liberty et al. |
| 2018/0349158 | A1 | 12/2018 | Swersky et al. |
| 2019/0312800 | A1 | 10/2019 | Schibler et al. |
| 2019/0370643 | A1 | 12/2019 | Aflalo et al. |
| 2020/0042362 | A1 | 2/2020 | Cui et al. |
| 2020/0065712 | A1 | 2/2020 | Wang et al. |
| 2020/0125545 | A1 | 4/2020 | Idicula et al. |
| 2020/0219007 | A1 | 7/2020 | Byers et al. |
| 2020/0293835 | A1 | 9/2020 | Doni et al. |
| 2020/0327264 | A1 | 10/2020 | Wang et al. |
| 2020/0348979 | A1 | 11/2020 | Calmon |
| 2020/0380378 | A1 | 12/2020 | Moharrer et al. |
| 2020/0401891 | A1* | 12/2020 | Xu ............................ G06N 3/08 |
| 2021/0110302 | A1 | 4/2021 | Nam et al. |
| 2021/0174210 | A1 | 6/2021 | Hsyu et al. |
| 2021/0224178 | A1 | 7/2021 | Singh et al. |
| 2021/0232473 | A1 | 7/2021 | Laskawiec |
| 2021/0241164 | A1 | 8/2021 | Powley et al. |
| 2021/0263934 | A1 | 8/2021 | Idicula et al. |
| 2021/0295191 | A1 | 9/2021 | Bui et al. |
| 2021/0342132 | A1 | 11/2021 | Parthasarathy et al. |
| 2022/0156639 | A1 | 5/2022 | Da et al. |
| 2022/0188700 | A1 | 6/2022 | Khavronin et al. |
| 2022/0238318 | A1 | 7/2022 | Ishikawa et al. |
| 2023/0162089 | A1 | 5/2023 | Farooq et al. |

OTHER PUBLICATIONS

Alipourfard et al., "CherryPick: Adaptively Unearthing the Best Cloud Configurations for Big Data Analytics", 14th USENIX Symposium on Networked Systems Design and Implementation (NSDI '17), Mar. 27-29, 2017, pp. 469-482.
B. Huang, M. Boehm, Y. Tian, B. Reinwald, S. Tatikonda, and F. R. Reiss. 2015. Resource Elasticity for Large-Scale Machine Learning. In Procs, of the 2015 ACM SIGMOD Int'l Conf, on Management of Data (SIGMOD '15). Assoc, for Computing Machinery, New York, NY, USA, 137-152. (Year: 2015).
B. Shahriari, K. Swersky, Z. Wang, R. P. Adams and N. de Freitas, "Taking the Human Out of the Loop: a Review of Bayesian Optimization," in Procs, of the IEEE, vol. 104, No. 1, pp. 148-175, Jan. 2016. (Year: 2016).
C. Thornton, F. Hutter, H. H. Hoos, and K. Leyton-Brown. 2013. Auto-WEKA: combined selection and hyperparameter optimization of classification algorithms. In Procs, of the 19th ACM SIGKDD Int'l Conf, on Knowledge Discovery and Data Mining (KDD '13). Assoc, for Computing Machinery, N.Y., NY, 847-855 (Year: 2013).
C.-J. Hsu, V. Nair, V. W. Freeh and T. Menzies, "Arrow: Low-Level Augmented Bayesian Optimization for Finding the Best Cloud VM," 2018 IEEE 38th International Conference on Distributed Computing Systems (ICDCS), 2018, pp. 660-670. (Year: 2018).
F. Yan, O. Ruwase, Y. He, and T. Chilimbi. 2015. Performance Modeling and Scalability Optimization of Distributed Deep Learning Systems. In Procs, of the 21th ACM SIGKDD Int'l Conf, on Knowledge Discovery and Data Mining (KDD '15). Assoc, for Computing Machinery, New York, NY, USA, 1355-1364. (Year. 2015).
H. Du, P. Han, W. Chen, Y. Wang and C. Zhang, "Otterman: a Novel Approach of Spark Auto-tuning by a Hybrid Strategy," 2018 5th International Conference on Systems and Informatics (ICSAI), 2018, pp. 478-483. (Year: 2018).
H. Herodotou, F. Dong, and S. Babu. 2011. No one (cluster) size fits all: automatic cluster sizing for data-intensive analytics. In Procs, of the 2nd ACM Symposium on Cloud Computing (SOCC '11). Assoc, for Computing Machinery, New York, NY, USA, Article 18, 1-14. (Year: 2011).
J. Kinnison, N. Kremer-Herman, D. Thain and W. Scheirer, "SHADHO: Massively Scalable Hardware-Aware Distributed Hyperparameter Optimization," 2018 IEEE Winter Conf, on Applications of Computer Vision (WACV), 2018, pp. 738-747. (Year: 2018).
J. Snoek, H. Larochelle, and R. P. Adams. 2012. Practical Bayesian Optimization of Machine Learning Algorithms. In Procs, of the 25th Int'l Conf, on Neural Information Processing Systems—vol. 2 (NIPS'12). Curran Associates Inc., Red Hook, NY, USA, 2951-2959. (Year: 2012).
J. Zhai, M. Liu, Y. Jin, X. Ma and W. Chen, "Automatic Cloud I/O Configurator for I/O Intensive Parallel Applications," in IEEE Transactions on Parallel and Distributed Systems, vol. 26, No. 12, pp. 3275-3288, Dec. 1, 2015. (Year: 2015).
Kaoudi et al., "A Cost-Based Optimizer for Gradient Descent Optimization," Mar. 27, 2017, arXiv:1703.09193v1 [cs.DB], (Year: 2017).
L. Fischer, S. Gao and A. Bernstein, "Machines Tuning Machines: Configuring Distributed Stream Processors with Bayesian Optimization," 2015 IEEE International Conference on Cluster Computing, 2015, pp. 22-31, doi: 10.1109/CLUSTER.2015.13. (Year: 2015).
L. Kotthoff, C. Thornton, H. H. Hoos, F. Hutter and K. Leyton-Brown, "Auto-WEKA 2.0: Automatic model selection and hyperparameter optimization in WEKA," Journal of Machine Learning Research, vol. 18, No. 25, pp. 1-5, 2017. (Year: 2017).
Li et al., "Hyperband: a Novel Bandit-Based Approach to Hyperparameter Optimization", Journal of Machine Learning Research, 2018, pp. 1-52.
Li et al., "Massively Parallel Hyperparameter Tuning", Oct. 13, 2018, 13 pages.
Liu et al., "Towards Self-Tuning Parameter Servers," Oct. 6, 2018, arXiv:1810.02935v1 [cs.DB], (Year: 2018).
Lu et al., "Hyper-parameter Tuning under a Budget Constraint," Feb. 1, 2019, arXiv:1902.00532v1 [cs.LG], (Year: 2019).
M. Trotter, T. Wood and J. Hwang, "Forecasting a Storm: Divining Optimal Configurations using Genetic Algorithms and Supervised Learning," 2019 IEEE Int'l Conf, on Autonomic Computing (ICAC), 2019, pp. 136-146. (Year: 2019).
N. Nguyen, M. Maifi Hasan Khan and K. Wang, "Towards Automatic Tuning of Apache Spark Configuration," 2018 IEEE 11th Int'l Conf, on Cloud Computing (CLOUD), 2018, pp. 417-425. (Year: 2018).
Pan et al., "Hemingway: Modeling Distributed Optimization Algorithms," Feb. 20, 2017, arXiv:1702.05865v1 [cs.DC] (Year: 2017).
Peng et al., "Optimus: an Efficient Dynamic Resource Scheduler for Deep Learning Clusters", EuroSys '18, ACM, Apr. 23-26, 2018, 14 pages.
Tong Yu, "Hyper-Parameter Optimization: a Review of Algorithms and Applications", Mar. 12, 2020, 38 pages.
W.-Y. Lee et al., "Automating System Configuration of Distributed Machine Learning," 2019 IEEE 39th Int'l Conf on Distributed Computing Systems (ICDCS), 2019, pp. 2057-2067. (Year: 2019).
Zhang et al., "SLAQ: Quality-Driven Scheduling for Distributed Machine Learning", SoCC '17, ACM, 2017, pp. 390-404.

* cited by examiner

SYSTEMS AND METHODS OF RESOURCE CONFIGURATION OPTIMIZATION FOR MACHINE LEARNING WORKLOADS

CROSS REFERENCE TO RELATED APPLICATIONS

This application is a continuation of, and claims the priority benefit of, U.S. patent application Ser. No. 16/874,479, filed on May 14, 2020, the contents of which are incorporated herein by reference in their entirety.

DESCRIPTION OF THE RELATED ART

Machine learning (ML) can refer to a method of data analysis in which the building of an analytical model is automated. ML is commonly considered to be a branch of artificial intelligence (AI), where systems are configured and allowed to learn from gathered data. Such systems can identify patterns and/or make decisions with little to no human intervention using the analytical model developed during training.

ML techniques are being used to solve increasingly challenging problems that involve analyzing larger and larger amounts of data. Hence, training ML models has become a resource-intensive and time-consuming process. One aspect of training ML models involves finding hyperparameter values that yield the best accuracy, referred to as hyperparameter tuning.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof.

Figure 1:
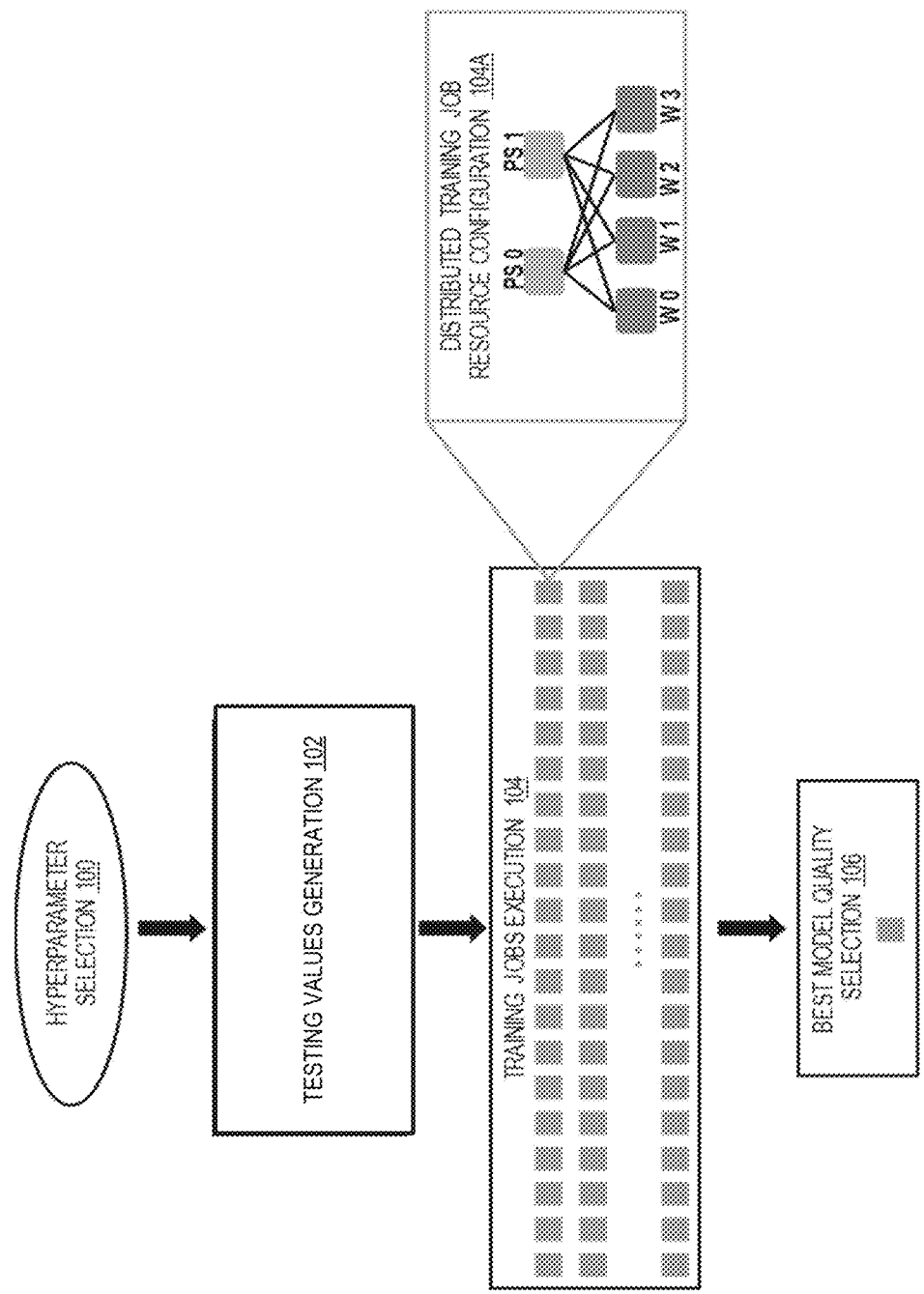
FIG. 1 illustrates an example hyperparameter tuning process context for which various embodiments may be implemented.

The figures are not intended to be exhaustive or to limit embodiments to the precise form disclosed. It should be understood that the invention can be practiced with modification and alteration, and that the disclosed technology be limited only by the claims and the equivalents thereof.

DETAILED DESCRIPTION

As alluded to above, the training of ML models is becoming a more resource-intensive and time-consuming process as the complexity of ML models increases, and the size of datasets used to train ML models increases. As also mentioned above, one step in the ML model training process includes hyperparameter tuning. Hyperparameters are adjustable parameters chosen to train a model that govern the training process itself. That is, hyperparameters are parameters that define the model architecture, e.g., degree of polynomial features to use, max. depth allowed for a decision tree, etc. Hyperparameter tuning typically involves a large number of exploratory experiments to test different combinations of possible values of various hyperparameters. Hyperparameter tuning can be accomplished using multiple computing nodes, e.g., in parallel, to test different combinations of possible hyperparameter values, and multiple parameter servers to synchronize the results of the distributed/parallel hyperparameter tuning process.

Various embodiments are directed to optimizing resource allocation during the hyperparameter tuning process, e.g., how many computing nodes are needed, how many parameter servers are needed, and how to allocate server resources (CPU/memory) amongst the parameter servers and worker nodes. It has been shown that different resource allocation configurations can have up to a 26.8% impact on job completion time for ML in general, and the impact can be further amplified during hyperparameter tuning due to the need for executing "massive" numbers of ML training jobs to find the best hyperparameter values. Thus, unlike existing efforts in ML resource allocation, e.g., scheduling resources based on model quality (e.g., ability of the model to predict or otherwise perform its desired function(s)) improvement levels, improving production model training time, and stopping low-performing jobs during hyperparameter tuning to redirecting to more promising jobs, various embodiments improve completion time of the hyperparameter tuning phase. Moreover, various embodiments can be implemented across different types of ML models. It should be noted that although resource allocation optimization is described herein in the context of hyperparameter or deep learning parameter tuning, various embodiments can be applied to improve/optimize how resources may be allocated in other contexts. To accomplish operations involving multiple tasks or jobs, appropriate resource allocation can be useful to reduce the amount of time needed to perform those multiple tasks/jobs. For example, some embodiments can be used to allocate resources in re-training cases, where a simulation model is, e.g., trained with a new dataset. Upon identifying an optimal resource configuration/allocation, that optimal resource configuration/allocation can be used for future training.

To achieve improved hyperparameter tuning times by optimally allocating resources used during the hyperparameter tuning process, the following workflow is performed. It should be noted that from a practical implementation standpoint, a workflow can be provided as part of a ML workload orchestration platform and offered as a service. (1) ML training jobs and resource options are input into a resource configuration generator, where the ML training jobs include hyperparameter values that need to be evaluated. The resource options can be specified manually, e.g., defining the number of resources (e.g., CPUs) that should be used to perform a single training job, and how many jobs should be run in parallel. (2) All possible resource configurations based on the specified ML training jobs and resource options are determined. (3) A random selector randomly selects a first batch of training jobs to be run in parallel, along with applicable configuration vectors representative of the possible resource configurations. (4) The results are input into a Bayesian optimizer that then figures out a next batch of training jobs/configuration vectors to perform/use. This process is repeated until a predetermined number of resource configurations to test has been reached OR an improvement in completion time between the best and second-best resource configurations results is smaller than a specified threshold. (5) For any remaining ML training jobs, the best resource configuration is used.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters. In the context of the present disclosure optimal resource configuration or allocation can refer to a configuration(s) or allocation(s) of resources that provide a shortest completion time. However, other embodiments contemplated by the disclosed technology can be optimized in accordance with one or more other and/or alternative matrices or criteria, not limited to just completion time. Resource cost (cost to compute), for example, may be another metric or criteria upon which to perform optimization. The degree of optimization can also be varied in accordance with user needs/desires.

To provide some contextual background, an ML pipeline can generally include the following operations or phases: (1) defining an objective; (2) data engineering; (3) model exploration; (4) production model training; and (5) model/inference serving. Regarding objective definition, before ML is used, the objective is defined, e.g., the ML is to be used for recognizing objects in images for use in, e.g., autonomous driving applications. The data engineering aspects can involve data collection, cleaning the collected data, and perform other pre-processing of the data, e.g., labeling training data, scaling values, etc.

Models may then be explored/evaluated to best fit a model type to the defined objective. Hyperparameter turning occurs at this state, e.g., tuning the model to obtain the best/desired accuracy, including training a model with a small amount of data to determine how well the model will work. At this stage, a large number of "small" training jobs may be run. Jobs can be parallelized, potentially, to reduce the time needed to accomplish model exploration. Resource scheduling/allocation to cover the running of these jobs impacts completion time—hence why optimizing resource allocation can be advantageous.

Once a model is selected along with the best/desired parameters, all the data sets that have been collected can be used to train a production ML model. Here as well, resource scheduling can prove to be advantageous, where the training regards independent training jobs for better resource efficiency, model quality, and improved completion time. It should be understood that the selected model can be retrained with new data over time, e.g., periodically. Especially in an enterprise environment, multiple variants of the same model may exist, and the model serving stage may involve managing these model variants, as well as matching them with a request based on service level agreements.

FIG. 1 illustrates an example of a hyperparameter tuning process, and will be described in conjunction with FIG. 2, an example of a hyperparameter tuning system. At operation 100, hyperparameter selection is performed/occurs. As alluded to above, hyperparameter or deep learning parameter optimization/tuning involves choosing a set of optimal hyperparameter values for an ML algorithm, i.e., a parameter whose value is used to control the learning process. In contrast, other parameters/the value of other types of parameters (typically node weights) are learned. For example, a model may define a particular structure, e.g., network layer types, numbers of network layers, etc. A ResNet-50 convolutional neural network model may have 50 layers, and this layer parameter may be thought of as being fixed, and/or set. Other parameters, such as the parameters connecting each of the layers are trained, and received as output of the model.

In order to optimize the model, however, those fixed parameters or those parameters that are set beforehand (the hyperparameters) can be tuned. Such hyperparameters, in the neural network context, may include, e.g., learning rate, the number of samples used for training in one batch, in a support vector machine, the regularization constant, or kernel parameter, in a random forest model, the number of trees, maximum tree depth, etc. These are examples and not meant to be limiting. Tuning of these hyperparameters allows a value(s) to be selected for use by/in the model. Examples of approaches to accomplish hyperparameter tuning include, e.g., grid searching, random searching, Bayesian optimization, gradient-based optimization, etc. It is the execution of the tasks making up the hyperparameter tuning searches that can be accelerated/optimized using various embodiments of the present disclosure. For example, using a grid search algorithm to determine an optimal learning rate for a ResNet 50 model will generate a number of tasks, and various embodiments, when applied, can speed up execution of these tasks.

Returning to FIG. 1, hyperparameter selection may occur at 100. As discussed above, given a particular ML model, one or more hyperparameters are to be tuned. A hyperparameter tuning algorithm may be selected, e.g., the aforementioned grid selection algorithm, to select a hyperparameter value, e.g., a value reflecting a desired learning rate for the ResNet-50 model. A number of tasks or jobs to be run can be generated by the grid search algorithm in order to return a value that potentially can be used to set the learning rate hyperparameter. That is, testing values can be generated at 102. The execution of these jobs at 104 in containers (each "box" comprising instances of parameter server programs and worker processes/threads, described below, being executed) will give a sense of whether or not a particular value is a "good" value, a "bad" value, etc. Each of these jobs can be considered a small ML model training job, where following this example, each job will output a different learning rate value. The model, in this case, the ResNet-50 model, can be set to have a learning rate commensurate with each of the output values. The ResNet-50 model may then be trained with a small data training subset (trained using a distributed training architecture/system) to see how the model performs when using/set to a particular learning rate value.

Figure 2:
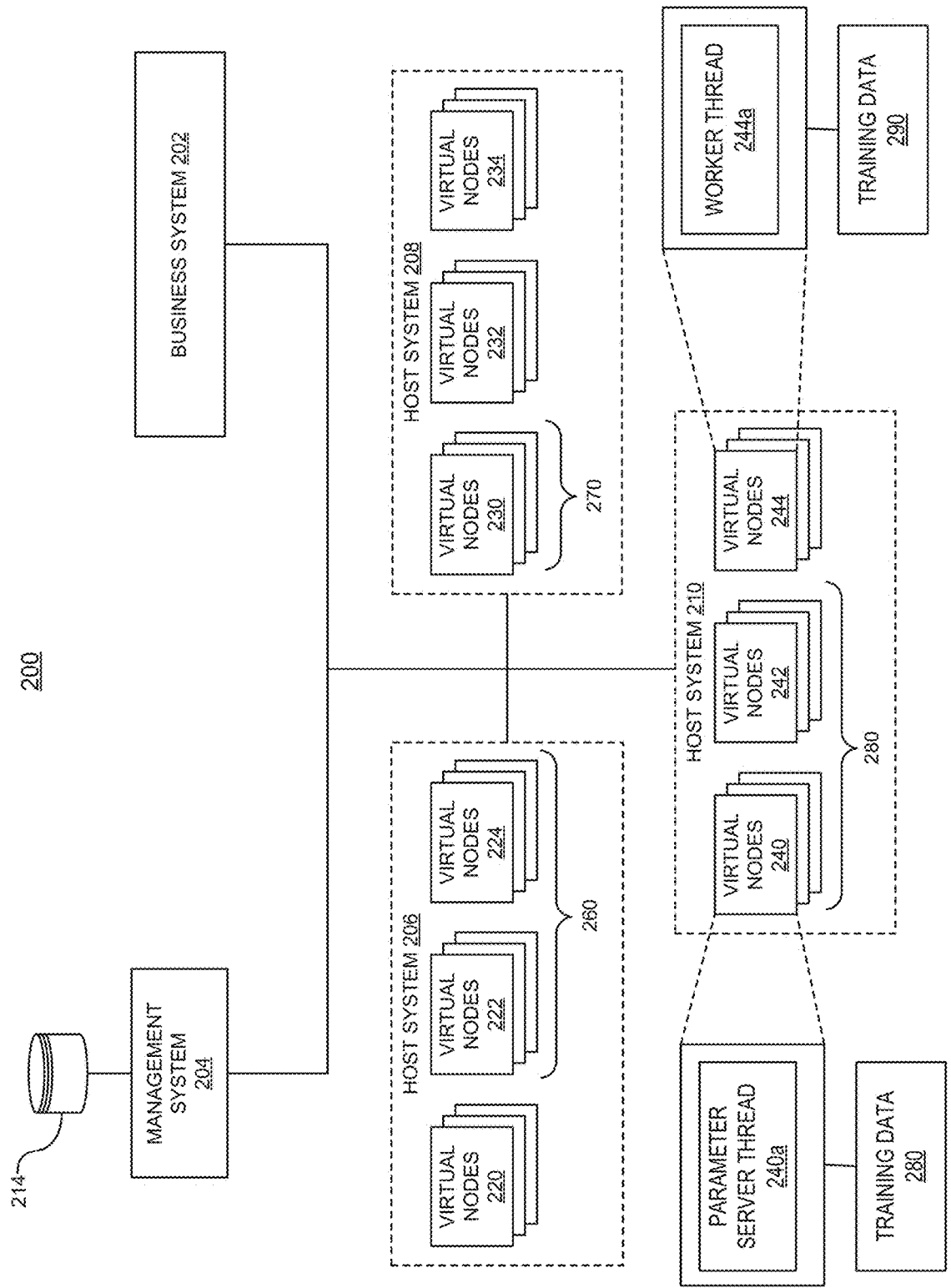
FIG. 2 illustrates an example distributed training environment for performing the hyperparameter tuning process of FIG. 1.

FIG. 2 illustrates an example distributed training environment 200 for hyperparameter tuning jobs. As shown in FIG. 2, environment 200 may include a business system 202, a management system 204, and a plurality of host systems 206, 208, 210, all communicatively coupled to each other over a communications network. The solid black line connecting the various elements of environment 200 may be a wired connection, a wireless connection, or a combination thereof, depending on the implementation. In various embodiments, the environment 200 may be implemented in a private cloud, a public cloud, a hybrid cloud, or other type of communications network.

The environment 200 provides a network environment for implementing machine learning models. The business system 202 can be any application within a network configured to provide some functionality to an end user. Each business system 202 may leverage one or more machine learning models to gain further insights into obtained data to help the business system 202 more accurately and effectively provide intended results to the end user. As a non-limiting example, an example business system 202 may be designed to identify the presence of one or more items or persons in a location based on captured images. The business system 202 could more effectively identify the items or persons by sending image data to one or more machine learning models of the environment 200 that are designed and trained to identify the one or more items or persons (e.g., face recognition models, scene parsing models, etc.). Although shown as a single system, the business system 202 can comprise a plurality of different business systems and applications. In some embodiments, the business system 202 can be one or more types of computing devices, including but not limited to a laptop, a desktop, a tablet, a server, among others. In some embodiments, the business system 202 may access the environment 200 through a web portal or other access point. In various embodiments, the business system 202 can also be realized as another host system (similar to host systems 206, 208, 210) within the environment 200 (i.e., also referred to as an "application cluster"). When implemented as an application cluster, the business system 202 can comprise a plurality of nodes, in this example virtual nodes (similar to the virtual nodes discussed below with respect to the host system 206, 208, 210) that represent the application cluster within environment 200.

As suggested by its name, the management system 204 manages the environment 200. The management system 204 can be configured to deploy clusters within the environment 200 using the host systems 206, 208, 210. These clusters may each comprise one or more virtual nodes, vapps, containers, workers/worker nodes, etc. to process data sets in parallel and perform specific operations within the environment 200. It should be understood that in a parameter server framework, groups of nodes (or a centralized server) can maintain globally shared parameters of a machine-learning model while the data and computation of calculating updates (i.e., gradient descent updates) are distributed across worker nodes. The clusters may deploy data processing frameworks or applications that may comprise Hadoop, Spark, Tensor-Flow, or other distributed data processing frameworks (i.e., compute engine). In various embodiments, storage repositories may be located on one or more other computing systems, such as server computers, desktop computers, or some other computing systems. The storage repositories may each represent data stored as a distributed file system, as object storage, or as some other data storage structure. Each deployment cluster can have an associated application programming interface (API) server configured for dependent distribution to allocate large-scale processing clusters in the environment 200, such as the dependent distribution described in U.S. Patent Publication No. 2017/0208138 titled "Allocating Edge Services With Large-Scale Processing Framework Clusters," which is hereby incorporated herein in its entirety.

The management system 204 can be configured to deploy one or more deployment clusters with one or more machine learning models attached therewith. Deployment of clusters and the deployment of machine learning models can be performed separately, with the deployment clusters being initialized without any machine learning models at the start, with machine learning models being attached while the deployment cluster is running. In deploying the deployment clusters, the management system 204 may be responsible for allocating computing resources of the host systems 206, 208, 210 to the clusters, and deploying the virtual nodes required for the clusters. The virtual nodes may comprise full operating system virtual machines or containers. The containers may comprise Linux containers, Docker containers, and other similar namespace-based containers. Rather than requiring a separate operating system, which is required for virtual machines, containers may share resources from the host computing system, wherein the resources may include kernel resources from the host operating system and may further include repositories and other approved resources that can be shared with other containers or processes executing on the host. However, although resources may be shared between the containers on a host system, the containers are provisioned to have private access to the operating system with their own identifier space, file system structure, and network interfaces. The operating system may also be responsible for allocating processing resources, memory resources, network resources, and other similar resources, to the containerized endpoint.

For managing the environment 200, the management system 204 can maintain one or more data structures that can be used to store job information associated with each of the resource configurations explored thereon. The one or more data structures may be stored in a database (not shown in FIG. 2) communicatively coupled to the management system 204. In some embodiments, management system 204 may be deployed as a separate cluster of computing devices within the environment 200, as a cluster of virtual nodes on a host system (e.g., host system 210), or a combination thereof. The database can be one or more local, non-transitory, machine-readable storage media associated with the management system 204, one or more remote, non-transitory, machine-readable storage media communicatively coupled to the management system 204, or a combination thereof. In various embodiments, the database may be non-volatile storage, including but not limited to flash memory, read-only memory (ROM), ferroelectric random access memory (f RAM), optical discs, solid-state devices (SSD), erasable programmable ROM (EPROM), electrically erasable programmable ROM (EEPROM), among others. The database can be mounted on all host systems 206, 208, 210.

Based on the configuration parameters received through registration of machine learning models, the management system 204 can create a serialized version of the machine learning model that is stored a model container repository 214. The model container repository 214 can one or more non-transitory machine-readable storage media including but not limited to flash memory, read-only memory (ROM), ferroelectric random access memory (fRAM), optical discs, solid-state devices (SSD), erasable programmable ROM (EPROM), electrically erasable programmable ROM (EEPROM), among others. The serialized machine learning models are deployable versions of the machine learning models that can be put into production for use by other systems within the environment 200.

When deploying a machine learning model on a deployment cluster, the management system 204 can mount the serialized version of one or more machine learning models from the repository 214 to the set of virtual nodes comprising the deployment cluster so that the virtual nodes will have access the serialized machine learning model in the repository 214 to be run and accessible on the deployment cluster.

In various embodiments, the repository 214 can maintain the raw metadata associated with the machine learning model as well as the serialized machine learning model (which is obtained during registration).

In various embodiments, each machine learning model may have an associated data structure within the management system 204 database, while in other embodiments a data structure may include an entry or row associated with each machine learning model of a plurality of machine learning models registered with the management system 204. The data structure(s) can maintain the configuration parameters associated with each machine learning model, including but not limited to the name of the compute engine associated with the model, the serialization information used for the machine learning model (e.g., serialization format, serialization library, etc.), a list of required compute resources for the machine learning module, version information for the machine learning model, machine learning library(s) used with the machine learning model, among others.

Such configuration parameters may be hyperparameters that can be tuned. For example, each node, e.g., virtual node 240, may include a parameter server thread 240*a* and some subset of training data 280. As another example, each node, e.g., virtual node 244 may include a hyperparameter tuning worker thread 244*a* and some subset of training data 290 with which to train an instance of a machine learning model at virtual node 244. Following the above, example an instance of the ResNet-50 model may be trained by virtual node 244, where a particular learning rate value generated by the grid search algorithm can be set in the ResNet-50 model which is then trained using training data 290 (which is a subset or sample of collected training data, for example). At the beginning of each epoch, worker thread 244*a* may pull the learning rate hyperparameter (and/or other hyperparameters) stored in a tensor data structure and can train the (Resnet-50) model according to the training data 290. That is, worker thread 244*a* may be a process that executes on virtual node 244 that determines data gradients based on a parameter copy and associated training data, where worker thread 244*a* calculates its data gradients, and along with other worker threads implemented across the various host systems 206, 208, 210 and virtual nodes 220-224, 230-234, 240-244 to determine a hyperparameter value to use for the model.

Returning to FIG. 1, the training jobs can be distributed in some manner according to some resource configuration at 104A, e.g., including but not necessarily limited to the number of parameter servers needed, the number of workers needed, and how much CPU to allocate to each worker. That is, in the context of FIG. 2, a resource configuration may specify the number of nodes/hosts/worker threads (and processing power/resources to be used by each worker thread) needed to train the ResNet-50 model during hyperparameter tuning, in this example, of the learning rate hyperparameter, to arrive at a desirable learning rate value. The best quality version/iteration of the ResNet-50 model can be selected at 106 depending on, in this example, the learning rate hyperparameter value.

It should be understood that distributed training can occur, generally, synchronously or asynchronously. Synchronous distributed training can be performed by training local models (e.g., at virtual nodes 220-224, 230-243, 240-244 of FIG. 2) using different parts or subsets of data from a single (large) data batch. In synchronous distributed training, all the nodes sent their gradients after all the nodes have completed their training, after which a "global" model can be updated. In asynchronous distributed training, no training device, e.g., virtual nodes 220-224, 230-243, 240-244) need to wait for other nodes/devices to complete their training. Central parameter servers can be used to aggregate shared gradients as each node completes its respective training. It should be noted that in some cases, a model itself can be segmented into different parts that can be concurrently trained using the same data (subset of data) at different nodes, while in some cases, the training data is divided into multiple subsets (data parallelism), each of which can be used to train a common, local model at each node, after which the model parameters can be shared and aggregated. In some embodiments, asynchronous distributed training can be performed by the virtual nodes of FIG. 2 in accordance with a data parallelism scheme. That is, each of virtual nodes 220-224, 230-243, 240-244 may train the same instance/version of a model, in this case the aforementioned ResNet-50 model, using different subsets of training data (training data 290). It should be noted that such an architecture is not the only architecture that can be optimized in accordance with various embodiments, but in some cases, may provide the greatest possibility for improvement.

Figure 3:
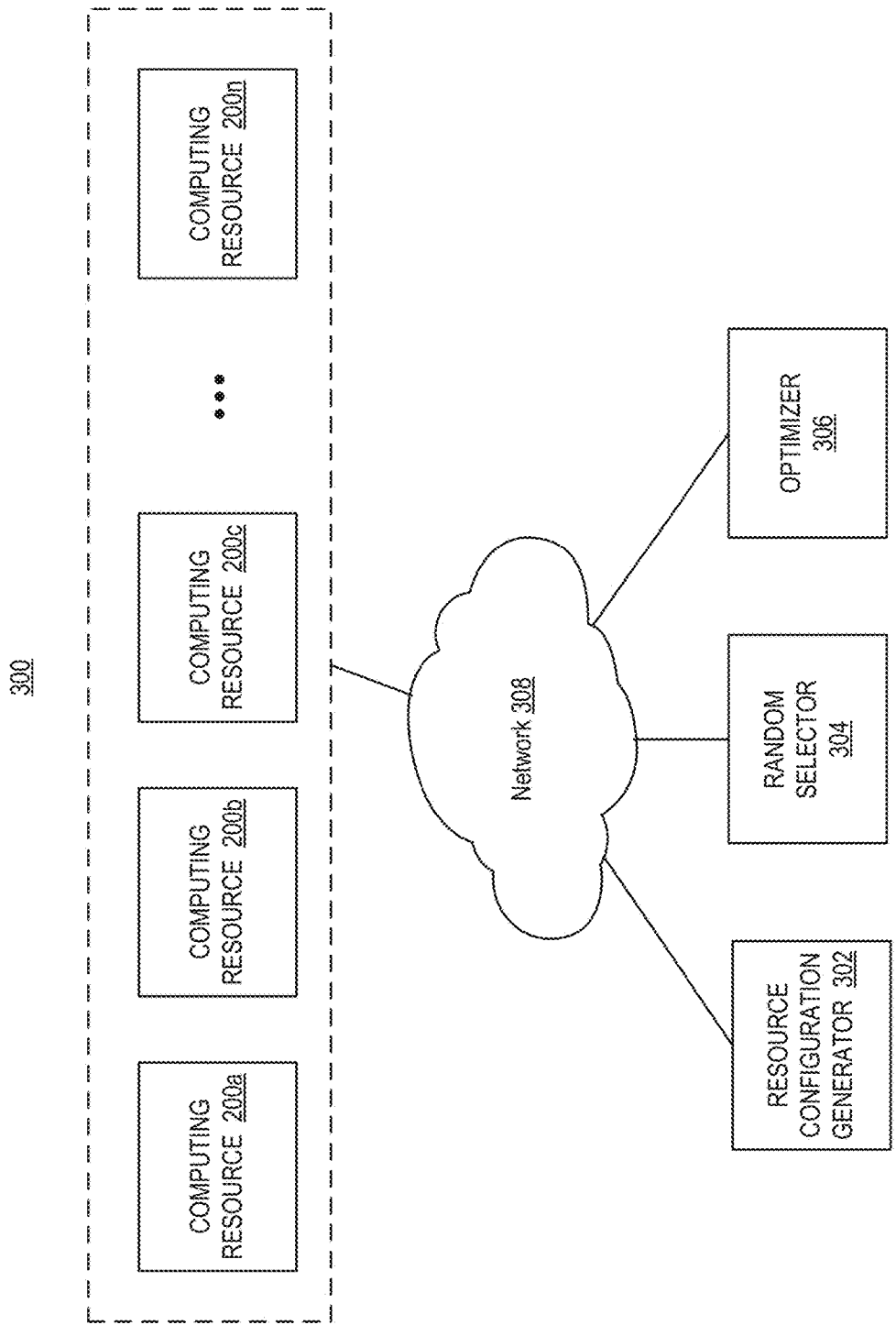
FIG. 3 illustrates an example system architecture of an orchestration platform for performing resource allocation optimization in accordance with various embodiments.

FIG. 3 illustrates an example architecture 300 for optimizing resource allocation for hyperparameter tuning in accordance with one embodiment, and will be described in conjunction with FIG. 4, a flow chart of example operations that can be performed to achieve resource allocation optimization in one embodiment. Architecture 300 can include a resource configuration generator 302, a random selector 304, and an optimizer 306 operatively communicating through a network 308 to generate and/or select an optimal resource configuration with which to perform hyperparameter tuning in a distributed training environment, such as environment 200 (FIG. 2). Architecture 300 can include additional components/elements, or fewer components/elements. Architecture 300 can be provided as part of an orchestration platform or service. For example, architecture 300 may be implemented as part of a Kubernetes platform to allocate resources for containers running model training jobs and scheduling those jobs, e.g., determining how many servers are available, and which servers to select to execute such training jobs.

Network 308 can include any combination of electronics communications networks enabling communication between components of architecture 300. For example, network 308 may include the Internet and/or any type of wide area network, an intranet, a metropolitan area network, a local area network (LAN), a wireless network, a cellular communications network, a Bluetooth network, a radio network, a device bus, or any other type of electronics communications network known to one of skill in the art.

As described above, each of computing resources 200*a*, 200*b*, 200*c*, . . . 200*n*, may represent some aspect of memory, parameter server(s), worker(s), and CPU allocated to each of the worker(s) that can be combined into a configuration of resources for hyperparameter tuning. Resource configuration generator 302, random selector 304, and optimizer 306, may make up, at least in part, an orchestration platform, and may each comprise or include one or more computing devices or processors adapted to generate a configuration, randomly select training jobs to be executed, and optimize resource configuration, respectively, in accordance with available computing resources that can be leveraged to perform hyperparameter tuning. In some embodiments, as discussed above, optimal resource allocation can refer to a resource configuration that can complete the model training jobs in the least amount of time.

Figure 4:
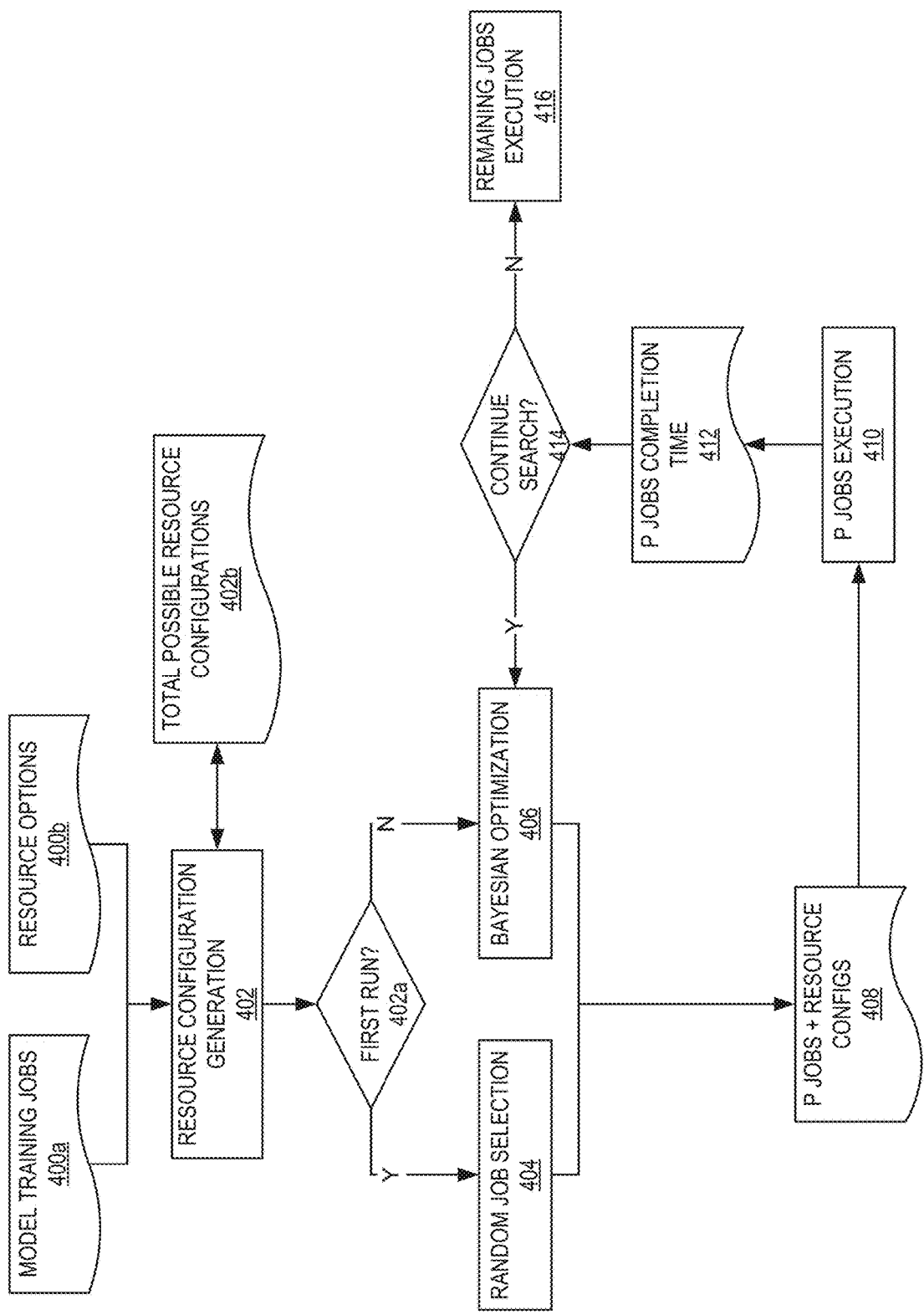
FIG. 4 illustrates an example resource allocation optimization method.

Referring to FIG. 4, inputs to resource configuration generation operation 402 (performed by resource configuration generator 302) may include model training jobs 400a and resource options 400b. As noted above, a hyperparameter tuning algorithm may generate a number of tasks/training jobs to be performed to select a desirable hyperparameter value for a given model. Resource options 400b may comprise total available resources (CPU allocation, worker processes or threads, parameter servers, number of containers, etc.) that can be allocated to performing the aforementioned training jobs 400a, or in some embodiments, the available resources to be used per training job of the training jobs 400a. Resource options 400b can have an impact on the cost of performing the training jobs, e.g., if the training jobs are to be performed on some paid platform. Resource configuration generator 302 may perform resource configuration generation at operation 402 to generate all the possible (and/or reasonable) resource configurations of a given system or architecture. For example, with a resource budget of seven CPUS, possible resource configurations depending on the seven CPUS may equate to 140 resource configurations. It should be noted that in some embodiments, boundaries or certain minima/maxima may be set. For example, in generating the possible resource configurations, a minimum CPU allocation may be specified or allocated by 0.5 increments. This may be desirable because setting minimum CPU allocation increments could theoretically lead to an infinite number of possible resource configurations. The context of the jobs/tasks being performed may also drive resource configuration boundaries, e.g., in some contexts, considering anything less than integer (1, 2, 3, etc.) CPU allocations is irrelevant.

If model training with a small subset of training data is the first run at 402a, a random job selection operation at 404 is performed (by random selector 304) to select a training job to execute. Because there is no existing information (whether one resource configuration will result in faster training job completion) with which to narrow down configurations, some number of jobs, p, will be randomly selected to be performed. It should be noted random job selection 404 can be performed in parallel, e.g., multiple training jobs can be selected and performed using possible resource configurations. In this way, the search process for an optimal resource configuration can be accelerated.

At 408, the randomly selected jobs, p, can matched with a selected resource configuration, and those jobs may be executed at 410 by the resources selected (nodes with the requisite memory, CPU allocation, worker threads, etc.) A completion time can be calculated at 412 to determine how long it took to complete the number of jobs, p, using the specified resource configuration. In-program memory, e.g., a queue, can be used to record/store what jobs or tasks have been performed, how many are waiting for testing, the possible resource configuration candidates, etc. Execution history can also or alternatively be stored or exported to a log on persistent storage, such as disk storage (local or remote). If the completion time is sufficiently short, the remaining jobs may be executed using the resource configuration that resulted in the desired/sufficiently short completion time at 416. If however, further reductions in completion time are required/desired, the search for an optimal resource configuration can continue.

Figure 5:
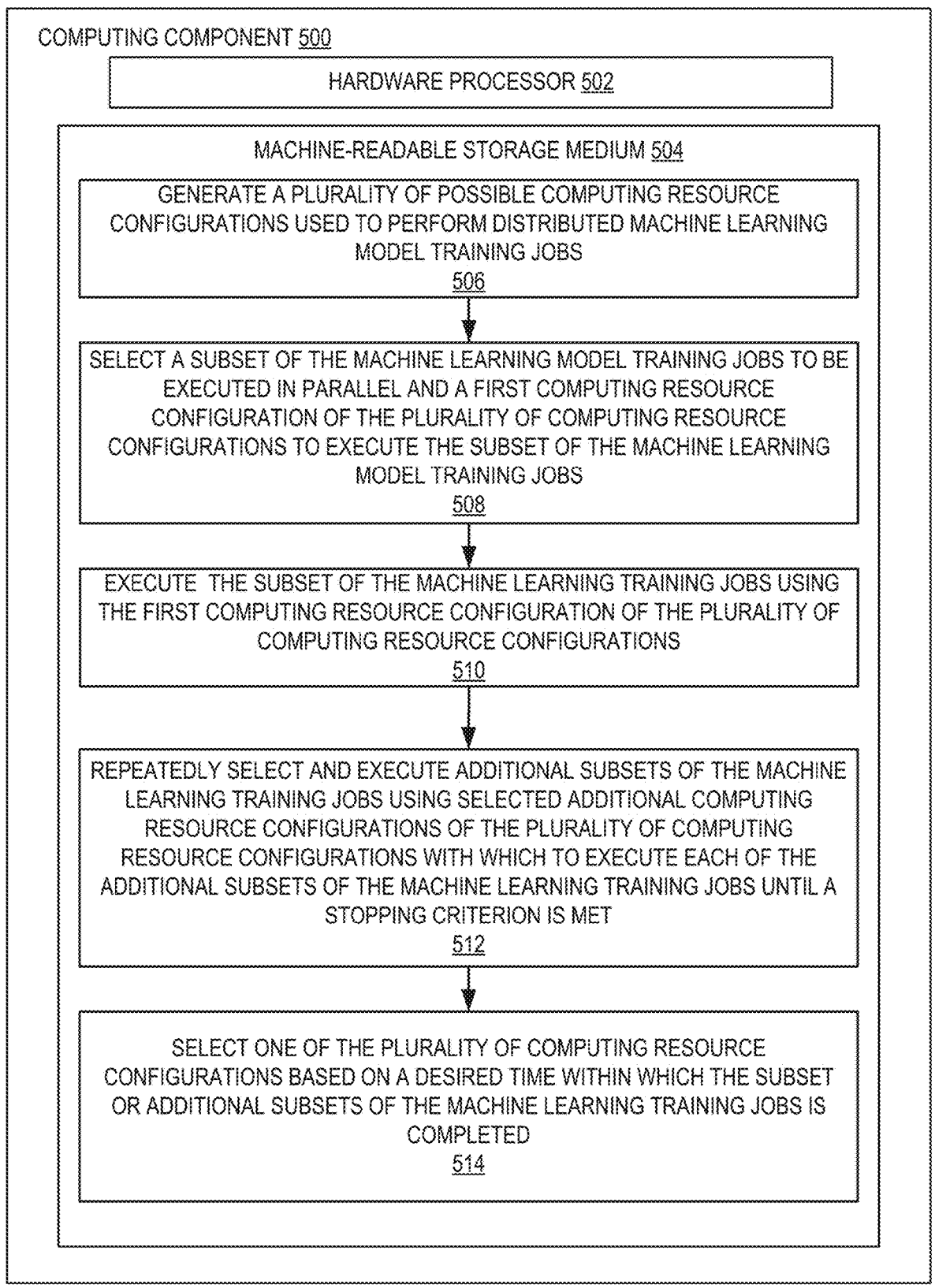
FIG. 5 is an example computing component that may be used to implement various features of resource allocation optimization in accordance with one embodiment of the disclosed technology.

At 406, Bayesian optimization can be performed by optimizer 306 to determine, based on prior executions of jobs using possible resource configurations, what remaining possible resource configurations may correspond to an optimal resource configuration. Although Bayesian optimization is used, other optimization techniques are possible. Using Bayesian optimization, the confidence gained through additional iterations (in this case executing training jobs in accordance with possible resource configurations) results in being able to better narrow down possible resource configurations. In some embodiments, an upper confidence bound is used, where in some testing, the use of upper confidence bound-based acquisition function results in an optimal resource configuration being identified, in less than 20 iterations. Generally, Bayesian optimization analyzes possible parameter values (in this case, resource configuration candidates), and gradually outputs specific parameter values (again, in this case, specific resource configuration candidates determined as being optimal) for achieving shortest possible job completion time to try/test. That is, a job completion time can be achieved based on a particular resource configuration, which can be fed back into the Bayesian Optimization process that will assess its effectiveness based on historical information, and a next resource configuration candidate to test can be output. FIG. 5 is an example computing component 500 that may be used to implement various features of an elected merge leader in accordance with one embodiment of the disclosed technology. Computing component 500 may be, for example, a server computer, a controller, or any other similar computing component capable of processing data. In the example implementation of FIG. 5, the computing component 500 includes a hardware processor 502, and machine-readable storage medium 504. In some embodiments, computing component 500 may be an embodiment of processor 50 of edge node 10 (FIG. 1C).

Hardware processor 502 may be one or more central processing units (CPUs), semiconductor-based microprocessors, and/or other hardware devices suitable for retrieval and execution of instructions stored in machine-readable storage medium 504. Hardware processor 502 may fetch, decode, and execute instructions, such as instructions 506-518, to control processes or operations for merging local parameters to effectuate swarm learning in a blockchain context using homomorphic encryption. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-514.

Hardware processor 502 may execute instruction 506 to generate a plurality of possible computing resource configurations used to perform distributed machine learning model training. As discussed above, training jobs during, e.g., hyperparameter tuning can involve training a given model using small data training subsets, where the given model may be set with/set to use a particular hyperparameter value.

A resource configuration generator (such as resource configuration generator 302 (FIG. 3) may determine all possible resource configurations, e.g., given a resource budget of CPU allocation, worker threads, parameter servers, etc.

Hardware processor 502 may execute instruction 508 to select a subset of machine learning model training jobs to be run in parallel and a subset of the plurality of computing resource configurations to execute the subset of the machine learning training jobs. In some embodiments, if the subset of machine learning model training jobs is the first subset to be executed, a random selector selects jobs to be run using one of the plurality of computing resource configurations.

Hardware processor 502 may execute instruction 510 to execute the subset of machine learning training jobs using a first computing resource configuration of the plurality of computing resource configurations. The execution of machine learning training jobs can be performed using a small subset of training data. In this way, the efficacy of the computing resource configuration may be tested at a high level.

Hardware processor 502 may execute instruction 512 to repeatedly select and execute additional subsets of the machine learning training jobs using selected additional computing resource configurations of the plurality of computing resource configurations with which to execute each of the additional subsets of the machine learning training jobs until a stopping criterion is met. After the initial subset of machine learning model training jobs is completed, subsequent subsets of machine learning model training jobs can be executed using other possible computing resource configurations. An optimizer component using, e.g., Bayesian optimization techniques may be used to more quickly narrow down the potential computing resource configurations that will provide the quickest completion time for training the model using the small training data subset.

It should be understood that the aforementioned stopping criterion can be a particular threshold, for example, regarding a reduction in completion time (or whatever metric/matrices may be the basis for optimization). That is, a current completion time associated with job performance using a current resource configuration candidate can be compared to a previous completion time associated with a previously tested resource configuration candidate. If the current completion time is less than a specified/determined percentage of reduction (e.g., less than a 5% reduction in completion time), that current resource configuration candidate can be deemed "good enough," such that subsequent resource configuration candidate testing can stop. It should be noted that other types of stopping criterion can be specified and used. In other embodiments, a maximum number of resource configuration job execution tests may be specified (which can be an integer value, some percentage of the total number of generated possible resource configurations, etc.) For example, if a possible 140 resource configuration candidates has been generated/identified, a stopping criterion of 70 trials can be set so that upon completion of the 70th job execution using the 70th resource configuration, optimization will end, and the resource configuration candidate producing the best completion time in those 70 trials may be selected as the optimum resource configuration to use for the remaining jobs.

Hardware processor 502 may execute instruction 514 to select one of the plurality of computing resource configurations based on a desired time within which the subset or additional subsets of the machine learning training jobs is completed. In this way, the remainder of the machine learning training jobs can be completed in the least amount of time possible given a particular computing resource configuration budget.

Figure 6:
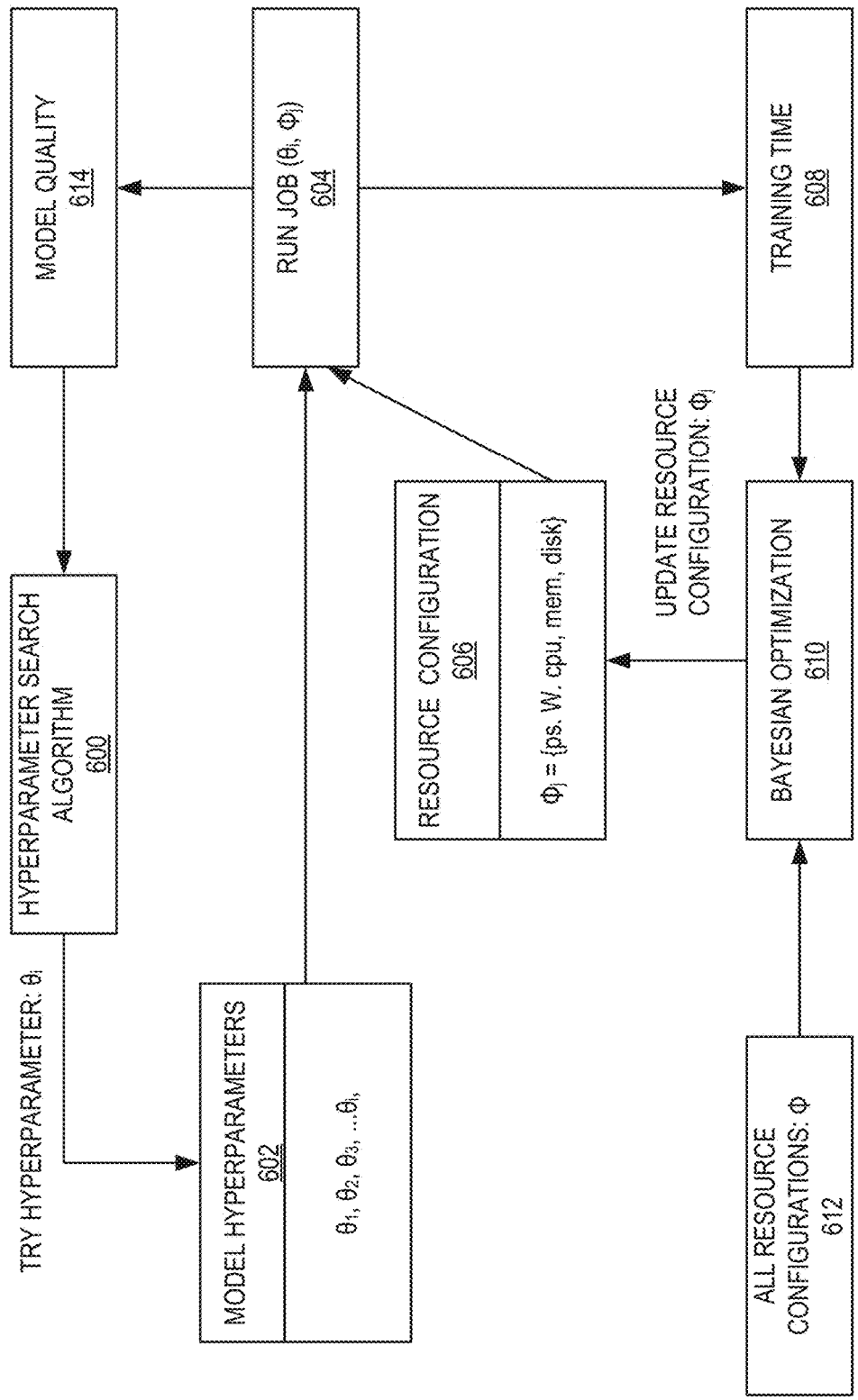
FIG. 6 illustrates an example TensorFlow-based resource allocation optimization method.

FIG. 6. Illustrates example operations that may be performed to determine an optimal resource configuration in the context of hyperparameter tuning using Tensorflow distributed deep learning framework. As described above, algorithms for hyperparameter searching/tuning exist, e.g., grid searching, random searching, gradient-based optimization, etc. Upon selection of such an algorithm, at 600, that algorithm can be applied to hyperparameters of a model (model hyperparameters 602) to be trained. In hyperparameter tuning, small training data subsets may be used to execute training jobs. The training jobs are tasks/jobs that can be performed at 604 to determine which hyperparameter values result in optimal model performance.

In accordance with various embodiments, resource configurations, e.g., a number of parameter servers, a number of workers/worker threads, CPU allocation, memory allocation, and disk space can be specified for a TensorFlow training job 606 (when distributed mode training is occurring in a TensorFlow framework). These different resource configurations can impact how quickly the training jobs are completed, and can reflect a number of parameter servers (node groups), CPU allocation, memory allocation, disk allocation, etc.). Accordingly, as described herein, various embodiments seek to optimize resource configurations, in this example, resource configurations, to achieve the quickest completion (training) time 608 for those training jobs. Thus, different resource configurations 606 may be used to execute different subsets of training jobs at 604.

In order to speed up the process of determining which resource configurations provide the quickest completion/training time for hyperparameter tuning, Bayesian optimization techniques may be applied at 610 to all (expect the first) potential resource configurations 612 to arrive at the aforementioned resource configurations 606 to be tested. At 614, model quality is determined to see if the optimal resource configuration has been found to run the training jobs in the least amount of time. If so, any remaining training jobs can be executed using the optimal resource configuration.

Figure 7:
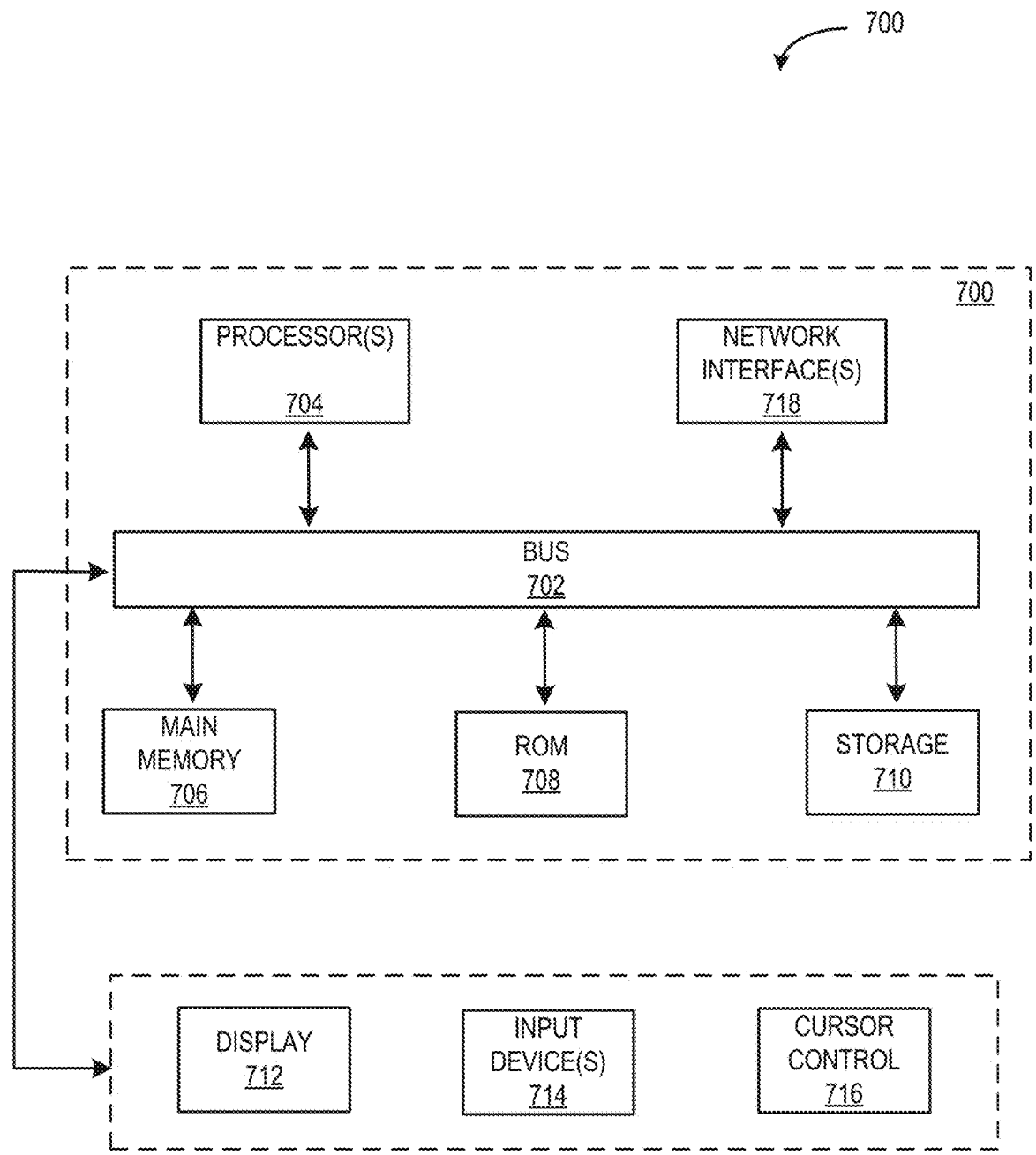
FIG. 7 is an example computing component that may be used to implement various features of embodiments of the present disclosure.

FIG. 7 depicts a block diagram of an example computer system 700 in which various embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicate with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit or component might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits or components described herein might be implemented as discrete circuits/components or the functions and features described can be shared in part or in total among one or more circuits/components. Even though various features or elements of functionality may be individually described or claimed as separate circuits/components, these features and functionality can be shared among one or more common circuits/components, and such description shall not require or imply that separate circuits/components are required to implement such features or functionality. Where a circuit/component is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An orchestration platform, comprising:
    a processor; and
    a memory unit operatively connected to the processor including computer code that when executed causes the processor to:
        apply a Bayesian optimization technique to a plurality of computing resource configurations used to perform machine learning model training jobs in training a machine learning model, wherein output of the Bayesian optimization technique determines a computing resource configuration of the plurality of computing resource configurations;
        execute a subset of the machine learning training jobs using the computing resource configuration of the plurality of computing resource configurations;
        repeatedly select additional subsets of the plurality of computing resource configurations and execute the additional subsets of the machine learning training jobs using the additional subsets of the computing resource configurations until a stopping criterion is met for a model hyperparameter associated with the machine learning model; and
        select one of the plurality of computing resource configurations from the additional subsets of the plurality of computing resource configurations, wherein the selection of the one of the plurality of computing resource configurations corresponds with a value of the model hyperparameter that is within a desired time within which the additional subsets of the computing resource configurations is completed.

2. The orchestration platform of claim 1, wherein each of the plurality of computing resource configurations comprises a specified central processing unit (CPU) allocation, a memory allocation, a parameter server allocation, and a worker thread allocation.

3. The orchestration platform of claim 1, wherein the processor is further caused to:
    select the subset of the machine learning training jobs to be executed by the computing resource configuration in accordance with a random selection process.

4. The orchestration platform of claim 1, wherein the machine learning training jobs comprise hyperparameter tuning machine learning training jobs.

5. The orchestration platform of claim 4, wherein the hyperparameter tuning machine learning training jobs comprise determining a quality of a machine learning model based on a value of the model hyperparameter associated with the machine learning model.

6. The orchestration platform of claim 1, wherein the stopping criterion comprises a determined number of computing resource configurations to be tested.

7. The orchestration platform of claim 1, wherein the stopping criterion comprises an improvement between first and second completion times associated with the execution of two of a plurality of machine learning training jobs that falls below a specified improvement threshold.

8. The orchestration platform of claim 1, wherein the processor is further caused to:
    repeatedly select and execute additional subsets of the machine learning training jobs and execute the additional subsets of the machine learning training jobs in parallel.

9. The orchestration platform of claim 1, wherein the processor is further caused to:
repeatedly select and execute additional subsets of the machine learning training jobs using selected additional computing resource configurations of the plurality of computing resource configurations and optimally select the additional computing resource configurations.

10. The orchestration platform of claim 1, wherein the resource configuration comprises a parameter server and worker configuration.

11. An orchestration platform, comprising:
a processor; and
a memory unit operatively connected to the processor including computer code that when executed causes the processor to:
using a random selector, select a first subset of machine learning training jobs to be executed using a first resource configuration of a plurality of computing resource configurations;
execute the first subset of the machine learning model training jobs using the first resource configuration;
determine that a threshold value associated with the execution of the first subset of the machine learning training jobs is met for a model hyperparameter associated with a machine learning model; and
select one of the plurality of computing resource configurations, the selection of one of the plurality of computing resource configurations corresponding with a value of the model hyperparameter and the selection being based on the threshold value.

12. The orchestration platform of claim 11, wherein each of the resource configurations comprises a specified central processing unit (CPU) allocation, a memory allocation, a parameter server allocation, and a worker thread allocation.

13. The orchestration platform of claim 11, wherein the machine learning training jobs comprise hyperparameter tuning machine learning training jobs.

14. The orchestration platform of claim 13, wherein the hyperparameter tuning machine learning training jobs comprise determining performance quality of a machine learning model based on a value of a hyperparameter associated with the machine learning model.

15. The orchestration platform of claim 11, wherein the processor is further caused to:
determine whether to continue searching for the resource configuration with which to execute the remaining subsets of the machine learning model training jobs based on the threshold value or to execute the remaining subsets of the machine learning model training jobs using the first resource configuration; and
determine if a number of computing resource configurations to be tested has exceeded a determining threshold.

16. The orchestration platform of claim 11, wherein the processor is further caused to:
determine whether to continue searching for the resource configuration with which to execute the remaining subsets of the machine learning model training jobs based on the threshold value or to execute the remaining subsets of the machine learning model training jobs using the first resource configuration; and
determine if an improvement between the threshold value and a subsequent completion associated with execution a subsequent subset of the machine learning training jobs falls below a specified improvement threshold.

17. The orchestration platform of claim 11, wherein the processor is further caused to:
determine whether to continue searching for the resource configuration with which to execute the remaining subsets of the machine learning model training jobs based on the threshold value or to execute the remaining subsets of the machine learning model training jobs using the first resource configuration; and
perform an optimization process to determine a second resource configuration of the plurality of computing resource configurations with which to execute a second subset of the machine learning training jobs.

18. The orchestration platform of claim 17, wherein the optimization process comprises a Bayesian optimization process.

19. The orchestration platform of claim 18, wherein the Bayesian optimization process is based on an upper confidence bound-based acquisition function.

20. The orchestration platform of claim 11, wherein the first resource configuration of the plurality of computing resource configurations comprises a TensorFlow configuration.

21. A computing resource, comprising:
a set of virtual nodes in a host system;
a processor; and
a memory unit operatively connected to the processor including computer code that when executed causes the processor to:
receive a first computing resource configuration that is determined by an orchestration platform, wherein the first computing resource configuration is determined by applying a Bayesian optimization technique to a plurality of computing resource configurations, and wherein output of the Bayesian optimization technique determines the first computing resource configuration;
execute a set of machine learning training jobs in training a machine learning model in accordance with the first computing resource configuration;
repeatedly receive additional configurations of the plurality of computing resource configurations and execute additional sets of the machine learning training jobs using the additional configurations of the plurality of computing resource configurations until a stopping criterion is met for a model hyperparameter associated with the machine learning model; and
initiate a transmission to the orchestration platform associated with the stopping criterion.

* * * * *